US006959307B2

(12) United States Patent
Apte

(10) Patent No.: US 6,959,307 B2
(45) Date of Patent: Oct. 25, 2005

(54) PROCESS AND SYSTEM FOR A CLIENT OBJECT TO PERFORM A REMOTE METHOD INVOCATION OF A METHOD IN A SERVER OBJECT

(75) Inventor: Ajay Arvind Apte, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/700,181

(22) Filed: Nov. 3, 2003

(65) Prior Publication Data

US 2004/0111730 A1 Jun. 10, 2004

Related U.S. Application Data

(63) Continuation of application No. 09/259,141, filed on Feb. 26, 1999, now abandoned.

(51) Int. Cl.[7] .............................................. G06F 17/30
(52) U.S. Cl. ..................................... 707/104.1; 707/10
(58) Field of Search .......................... 707/1, 3, 10, 100, 707/102, 103 R, 104.1; 709/201, 203, 217, 709/218, 219, 227; 717/107, 108, 126; 719/310, 719/315, 316, 319

(56) References Cited

U.S. PATENT DOCUMENTS

| 5,577,251 | A | 11/1996 | Hamilton et al. ........... 718/101 |
| 5,778,228 | A | 7/1998 | Wei ............................. 719/328 |
| 5,991,823 | A | 11/1999 | Cavanaugh, III et al. ... 719/330 |
| 6,125,383 | A | 9/2000 | Glynias et al. ............. 709/202 |
| 6,269,373 | B1 * | 7/2001 | Apte et al. ..................... 707/10 |
| 6,282,580 | B1 * | 8/2001 | Chang ......................... 719/316 |
| 6,374,308 | B1 | 4/2002 | Kempf et al. ............... 719/316 |
| 6,637,020 | B1 * | 10/2003 | Hammond ................... 717/107 |

OTHER PUBLICATIONS

Trevor et al., The Use of Adapters to Support Cooperative Sharing, 1994 ACM, pp. 219-230.*
Thomas et al., Enterprise JavaBeans Technology Server Component Model for the Java Platform, Patricia Seybold Group, pp. 1-24.*
Anne Thomas, Enterprise JavaBeans Technology, Patricia Seybold Group, Copy Right 1998, pp. 1-24.*
Jim Farley, (Translated by Yuichi Omata, etc.) "JAVA Distributed Computing", Kabusikigaisya O'REILLY Japan, Sep. 24, 1998, p. 47-87.
Tomozaburo Iwayama "(Japanese) IBM no JAVA Solution no Ketteiban, WebSphere Application Server", Computopia, Kbusikigaisya Computer Age Sya, Feb. 19, 1999 (JPO received), vol. 33, No. 390, p. 36-43 (CS-ND-1999-521-3).

(Continued)

Primary Examiner—Apu M. Mofiz
(74) Attorney, Agent, or Firm—Duke W. Yee; David A. Mims, Jr.; Wing Yan Mok

(57) ABSTRACT

An adapter is generated by introspecting on the interfaces of an Enterprise JavaBean (EJB) running on a CORBA server. The adapter resides on the Java client-side and contains a remote proxy of the CORBA server that runs the EJB. The adapter is a Java class that implements the interfaces specified by the EJB for invoking its business methods. Adapters delegate all of the business method calls from the client to the CORBA proxy on the server and perform data marshalling from the Java client to the CORBA proxy and vice versa. Any business method calls made by the client to the adapter are delegated by the adapter to the CORBA proxy after appropriate data conversion. Thus, the adapter acts as transparent glue between the Java client and the EJB on the CORBA server.

24 Claims, 10 Drawing Sheets

OTHER PUBLICATIONS

Tomozaburo Iwayama "(Japanese) Business Object Suishin Kyogikai to OMG ga Teikei-Kokusaihyojun ni sotta Component Kaihatsu wo suishin", Computopia, Kakusikigaisya Computer Age sya, Feb. 1, 1999, vol. 33, No. 389, p. 64-66 (CS-ND-1999-507-9).

Mark Betz, "Networking Objects with CORBA: Component Objects Meet Client/Server", Dr. Dobb's Journal, vol. 20, Issue 11, Nov. 1995, p. 18-26.

Alur et al., "Core J2EE Patterns: Best Practices and Design Strategies", Chapter 6: J2EE Patterns Overview, 2001, p. 122-149.

Alur et al., "Core J2EE Patterns: Best Practices and Design Strategies", Chapter 7: Presentation Tier Patterns, section titled "Intercepting Filter", 2001, p. 150-171.

Alur et al., "Core J2EE Patterns: Best Practices and Design Strategies", Chapter 8: Business Tier Patterns, section titled "Business Delegate", 2001, p. 246-260.

Thomas, "Enterprise JavaBeans™ Technology", Server Component Model for the Java Platform, Patricia Seybold Group, Dec. 1998.

Gamma et al., "Design Patterns", 1995, Addison-Wesley, pp. 139-150, 207-217.

* cited by examiner

Server
200

```
{
  Object obj = JavaNamingContext.lookup ("RemoteObjectName");   —902

CustomerInterface cast = (CustomerInterface) obj;              —904 cust.businessMethod (args);                                    —906
}
```

Figure 9A

```
public Object lookup(NameToBeLookedUp) {                                    —912

CorbaProxy proxy = CorbaNamingServices.lookup(NameToBeLookedUp);          —914

Class adapterClass = findAdapterClassForCorbaProxy(proxy);                —916

Adapter obj = new adapterClass(proxy);                                    —918 return obj                                                                —920
}
```

Figure 9B

```
{
  Object obj = RINamingContext.lookup("RemoteObjectName");       —922

CustomerInterface cust = (CustomerInterface) obj;              —924 cust.businessMethod(args);                                     —926
}
```

Figure 9C

```
public void businessMethod(args) {       —930 proxy.businessMethod(args)             —932
}
```

Figure 9D

-1000-{ public Customer businessMethod(integer I, Employee ee);

-1010-{ Object obj1= RINamingContext.lookup(EmployeeName);

-1012-{ Employee ee= (Employee) obj1;

-1014-{ Customer cust= (Customer)RINamingContext.lookup(CustomeName);

-1016-{ Customer newCust= cust.businessMethod(1,ee);

-1020-{ public Customer businessMethod (integer I, Employee ee) {

-1022-{ EmployeeAdapter eeAdapter = (EmployeeAdapter) ee;

-1024-{ EmployeeProxy eeProxy = eeAdapter.unwrapAdapter();

-1026-{ CustomerProxy custProxy = proxy.businessMethod(I,eeProxy);

-1028-{ CustomerAdapter custAdapter = new CustomerAdapter(custProxy);

-1030-{ return custAdapter;

PROCESS AND SYSTEM FOR A CLIENT OBJECT TO PERFORM A REMOTE METHOD INVOCATION OF A METHOD IN A SERVER OBJECT

CROSS-REFERENCE TO RELATED APPLICATIONS

The present application is a continuation of application Ser. No. 09/259,141, filed Feb. 26, 1999, now abandoned, and is related to application Ser. No. 09/259,172, filed (concurrently herewith), titled "Method and System for Persisting Beans as Container-Managed Fields," which is hereby incorporated by reference.

BACKGROUND OF THE INVENTION

1. Technical Field

The present invention relates generally to an improved distributed data processing system and in particular to a method and apparatus for a distributed application comprising objects on clients and servers within the distributed data processing system.

2. Description of Related Art

Software developers face the fundamental problem that writing an enterprise-wide application is difficult and that writing a distributed application is even more difficult. In addition, an enterprise seeks to build an application as fast as possible without being locked into one platform. Ideally, enterprise developers would like to be able to write the application once and run it on all of their platforms. Enterprise JavaBeans™ technology seeks to provide this ability.

The Enterprise JavaBeans (EJB) component architecture is designed to enable enterprises to build scalable, secure, multi-platform, business-critical applications as reusable, server-side components. Its purpose is to solve the enterprise problems by allowing the enterprise developer to focus only on writing business logic.

The server-side environment and the tools needed to service it have greatly influenced the design goals for EJB technology. One key design goal was to reduce the process of building distributed applications as much as possible. This goal has been accomplished by turning features that ordinarily would need to be hand-coded into simple declarative properties of the Enterprise JavaBeans. These declarative properties generate a significant increase in development efficiency because certain behaviors, like security and transactions, are set, not in code, but are "flags" on the bean itself.

The EJB specification creates an infrastructure that takes care of the system-level programming, such as transactions, security, threading, naming, object-life cycle, resource pooling, remote access, and persistence. It also simplifies access to existing applications, and provides a uniform application development model for tool creation use.

Java provides a mechanism by which a Java client can invoke methods on a Java server that is running in a separate process using a methodology called Remote Method Invocation (RMI). However, if the server is not running in a Java environment, such as a CORBA-compliant (Common Object Request Broker Architecture) server, then the Java client cannot make any method calls to the method on the CORBA server since Java does not provide an inherent mechanism for communicating with CORBA objects.

Simply stated, CORBA is an Object Request Broker (ORB) that allows applications to communicate with one another no matter where they are located or who has designed them. An ORB is the middleware that establishes the client-server relationships between objects. Enterprises have turned to CORBA as a solution to provide interoperability between various software applications.

There is no standard mechanism for performing data marshalling, i.e., data conversion for different types of data, between a Java client and a CORBA server. It would be advantageous to have a mechanism that allows a Java client to communicate with another Java application, such as an EJB, running in a non-Java environment, such as a CORBA server.

SUMMARY OF THE INVENTION

The present invention provides an adapter that is generated by introspecting on the interfaces of an Enterprise JavaBean (EJB) running on a Common Object Request Broker Architecture (CORBA) server. The adapter resides on the Java client-side and contains a remote proxy of the CORBA server that runs the EJB. The adapter is a Java class that implements the interfaces specified by the EJB for invoking its business methods. Adapters delegate all of the business method calls from the client to the CORBA proxy on the server and perform data marshaling from the Java client to the CORBA proxy and vice versa. Any business method calls made by the client to the adapter are delegated by the adapter to the CORBA proxy alter appropriate data conversion. Thus, the adapter acts as transparent glue between the Java client and the EJB on the COBRA server. The method may be generalized for a client object and a server object implemented in different languages. An adapter may wrap an object reference for a server object. While attempting to invoke a method in a server object, a client abject invokes a method within the adapter, which transparently uses the object reference to call a skeleton of the object reference on the server, which then calls the method within the server object.

BRIEF DESCRIPTION OF THE DRAWINGS

The novel features believed characteristic of the invention are set forth in the appended claims. The invention itself, however, as well as a preferred mode of use, further objectives and advantages thereof will best be understood by reference to the following detailed description of an illustrative embodiment when read in conjunction with the accompanying drawings, wherein:

FIGS. 9A–9D are examples of Java programming language statements describing a distributed application in which a Java client invokes a remote business method from an Enterprise JavaBean running in a CORBA server;

FIGS. 10A–10C are examples of Java programming language statements describing a process of wrapping and unwrapping EJBs used as arguments to Java methods.

DETAILED DESCRIPTION OF THE PREFERRED EMBODIMENT

Figure 1:
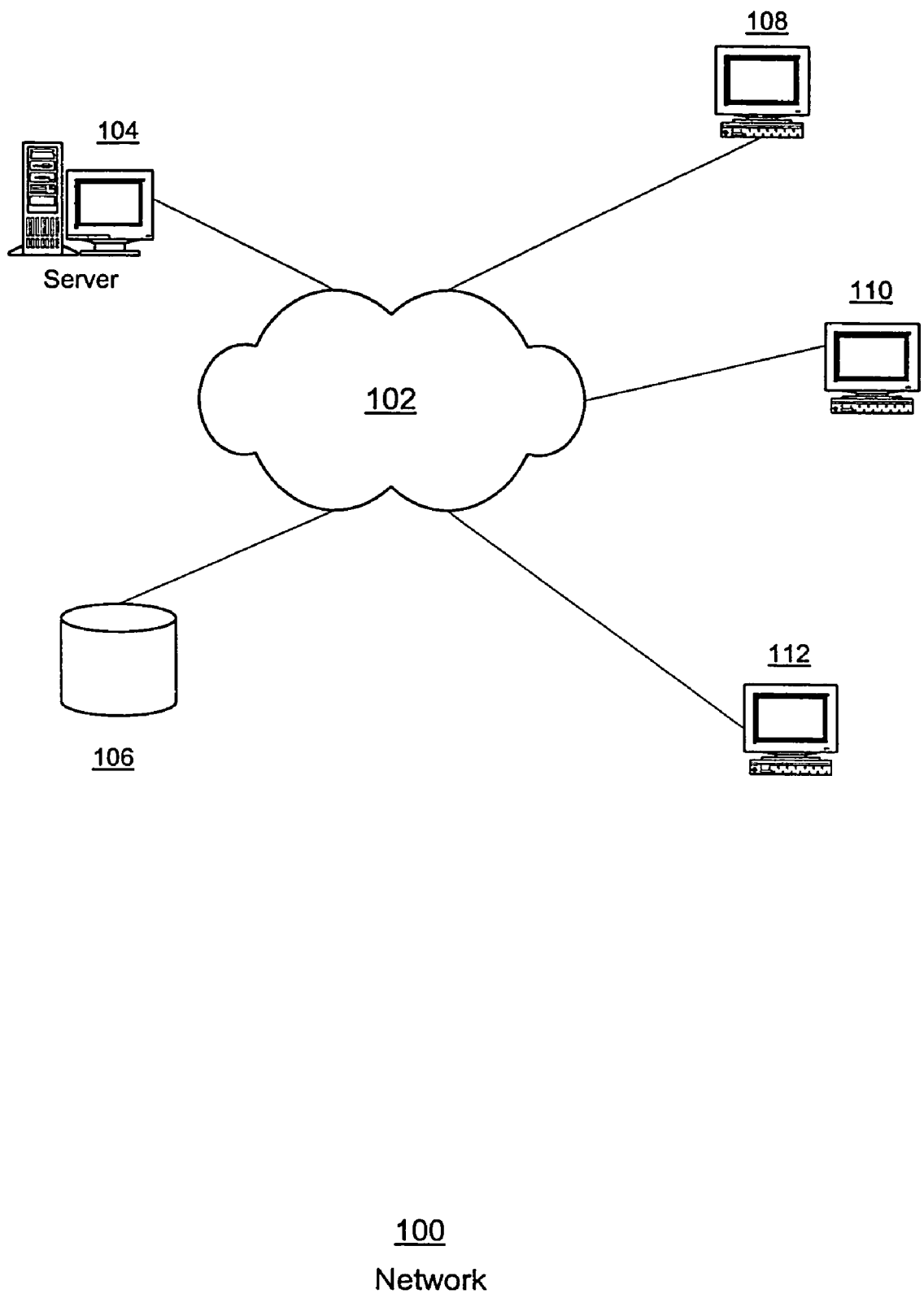
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
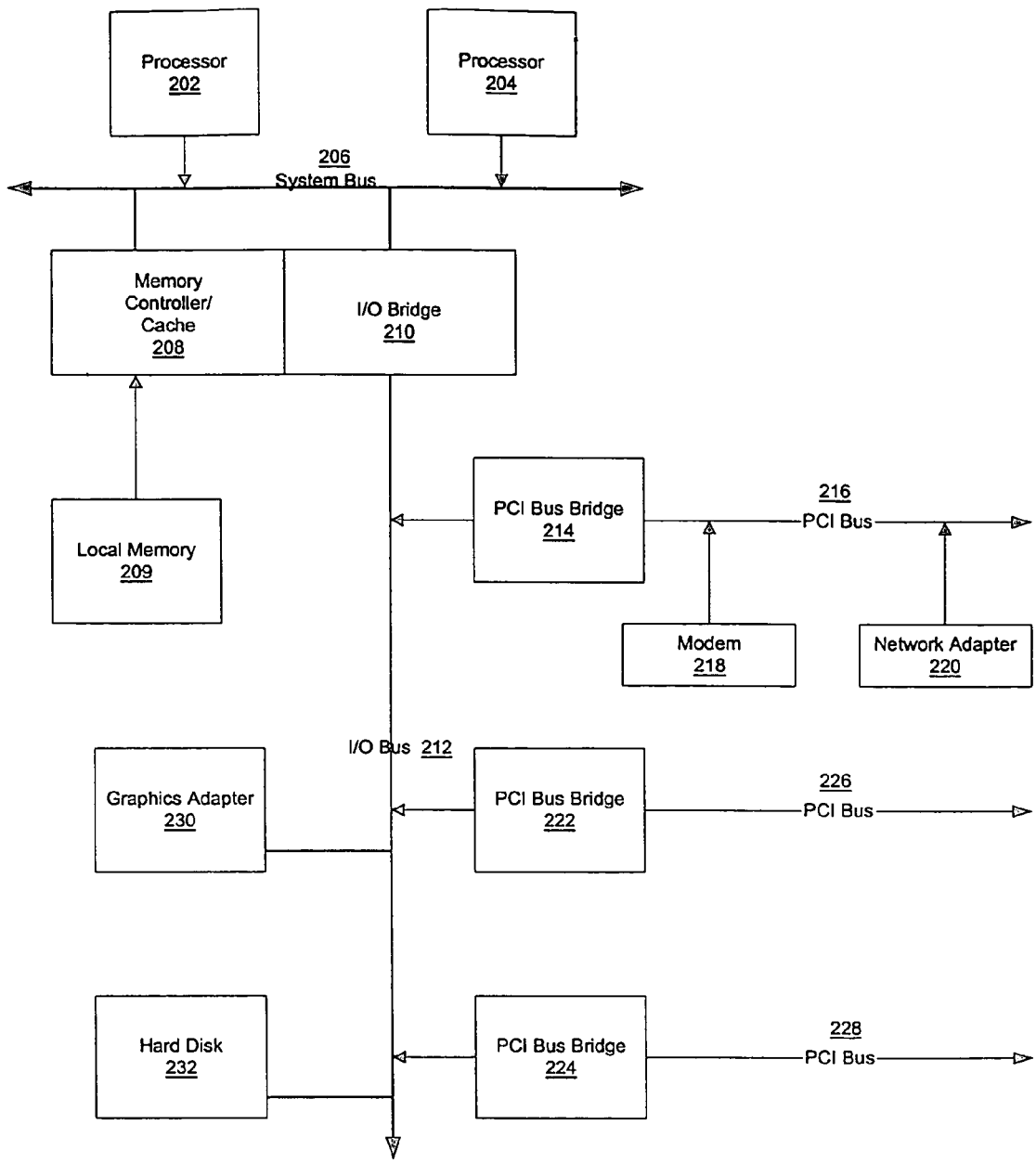
FIG. 2 is a block diagram depicting a data processing system which may be implemented as a server.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus. 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
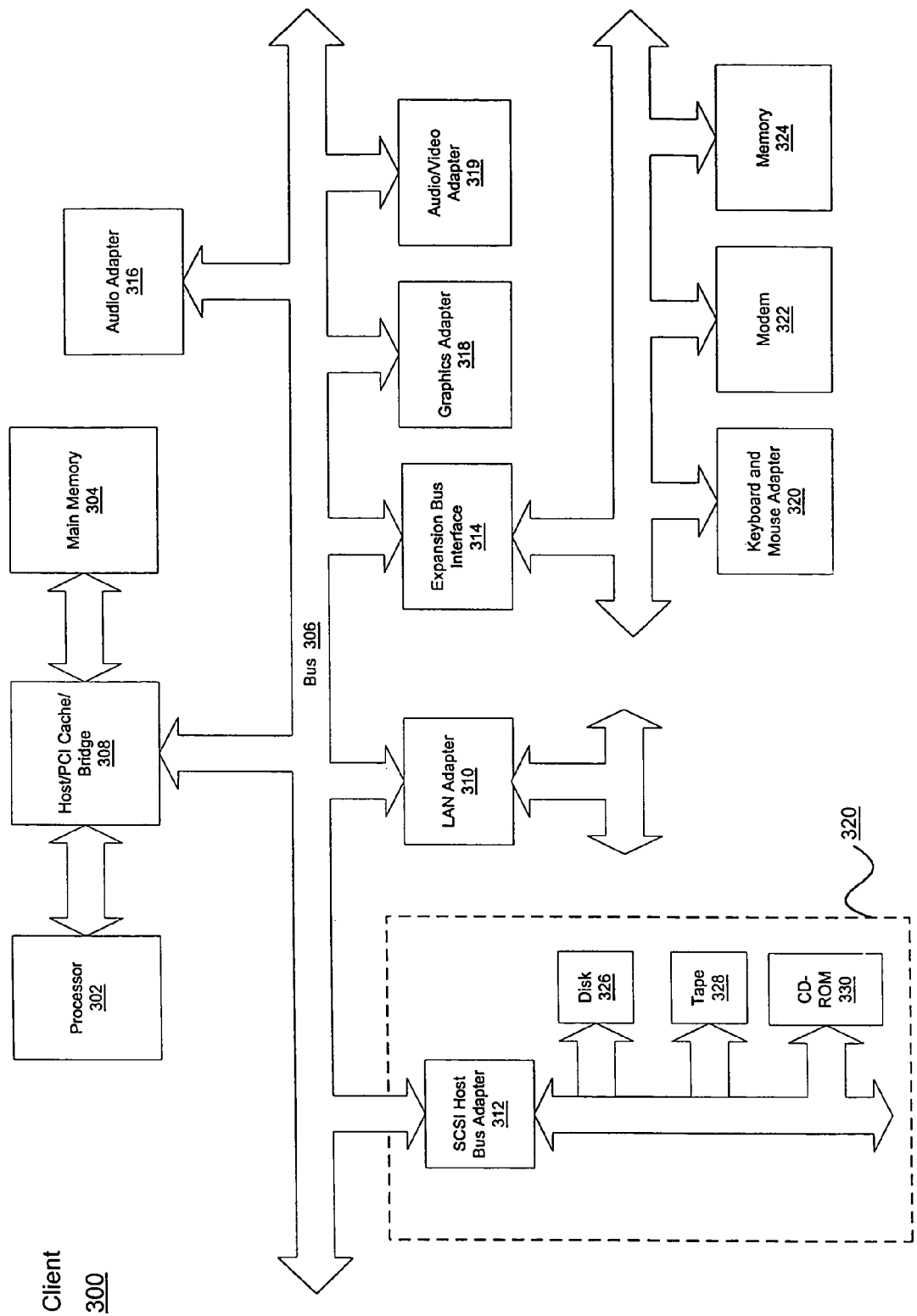
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, data processing system, and instructions for providing a distributed application in which a Java client can communicate with an EJB on a CORBA server. A more detailed description of generic distributed applications in the prior art is now given in order to provide a context for describing the present invention within a distributed application.

The processes of the present invention may be implemented using the Java programming system, which is an object-oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, but templates, which instruct a compiler how to construct the actual object. For example, a class may specify the number and type of data variables and the steps involved in the functions, which manipulate data. An object is actually created in the program by means of a special function called a constructor, which uses the corresponding class definition and additional information, such as arguments provided during object creation, to construct the object. Objects are destroyed by a special function called a destructor. Java also allows for the creation of totally abstract classes known as interfaces, which allow the defining of methods that may be shared with several classes without regard for how other classes are handling the methods.

Figure 4:
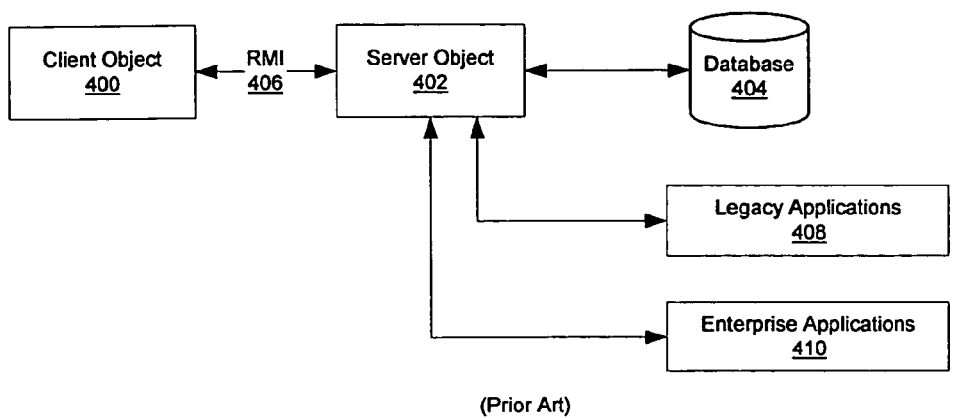
FIG. 4 is a diagram illustrating a prior art distributed application.

With reference now to FIG. 4, a diagram illustrating a prior art distributed application is depicted. As can be seen, client object 400 resides on the client-side of the distributed application while server object 402 forms the server-side of the distributed application. Client object 400 is located on a client computer, such as, for example, client 108 in distributed data processing system 100 in FIG. 1. Server object 402 is located on a server, such as server 104 in FIG. 1. Client object 400 may initiate calls to server object 402 to access database 404 based on various business rules or business logic implemented within server object 402. Database 404 may be located within the server or be a remote database. Server object 402 may also provide access to current enterprise applications 410 and access to legacy applications 408. A customizer may be provided to allow a user building a distributed application to configure a host name or the Internet Protocol (IP) address of the second tier computer implementing server object 402. In this example, a Java remote method invocation (RMI) protocol 406 is employed for distributed communication between objects, such as client object 400 and server object 402.

Server object 402 contains the actual business logic that is implemented using application programming interfaces (APIs) that utilize the Java-defined Java database connectivity (JDBC) structured query language (SQL) database access interface, which provides uniform access to a wide range of relational databases. In the depicted example, these databases may be found in database 404. Server object 402 contains methods used to provide needed functions invoked from client object 400. The above mentioned methods could be written to access other backend systems (i.e. CICS, IMS, MQ, SAP, etc.) and should not be restricted to just JDBC or database access.

Continuing with the example of database access within a distributed application, the database access functions may be divided into two objects—a client object and a server object. The server object implements an interface that contains the methods that are invoked from the client object and which use JDBC.

The client object can serve as an event source or an event sink for various events. At build time, the client object is used in a client-side builder environment and is connected to other client-side software components. For example, at client-side build time, an application assembler uses a client-side builder environment to connect a GUI object to the client object so that when a button is pressed an event will be sent to the object to retrieve certain data. At server-side build time, an application assembler uses a builder environment to connect the server object.

At run time, the user presses a button on the client, which signifies that certain data is requested for view. The GUI object generates an event, which is sent to the client object. The client object invokes a method on the server object requesting the needed data. The client object communicates with its corresponding server object by using such protocols as RMI or an Object Request Broker (ORB) using Internet InterOrb Protocol (IIOP). The server-side object retrieves the data and sends the data back to the client-side object. The data is then returned by the client-side object to the GUI object for display to the end-user.

In the depicted example, two Java beans may be employed that implement the client object 400 and server object 402. What makes a bean different from a pure object is that it has an external interface, called the properties interface, which allows a tool to read what the component is supposed to do and hook it up to other beans and plug it into another environment. Two different types of beans may be used-JavaBeans and Enterprise JavaBeans (EJB). JavaBeans are intended to be local to a single process and are often visible at runtime. This visual component may be a button, list box, graphic or chart, for example, but it is not a requirement.

An EJB is a non-visual, remote object designed to run on a server and be invoked by clients. An EJB can be built from multiple, non-visual JavaBeans. EJBs are intended to live on one machine and be invoked remotely from another machine, and EJBs have a deployment descriptor that is intended as a description about the bean that can be read by a tool. EJBs are also platform independent and can be used on any platform that supports Java.

Server beans or EJBs are remotely executable components or business objects deployed on the server. EJBs have a protocol that allows them to be accessed remotely, and this protocol also allows them to be installed or deployed on a particular server. They have a set of mechanisms that allow them to delegate major qualities of service, security, transactional behavior, concurrency (the ability to be accessed by more than one client at a time), and persistence (how their state can be saved) to the container in which they are placed on the EJB server. EJBs get their behavior from being installed in a container, which provides the different qualities of service. Any platform independent JavaBean can be adopted, through the use of a deployment tool, into a platform specific EJB that has the correct qualities of services available to meet the specific requirements of existing business systems and applications.

With this separation between client bean 400 and server bean 402, changes to various business logic within server bean 402 may be performed without having to modify client bean 400. This is desirable because there may be thousands of clients that access a single server. In addition, these processes also may be applied to programs written in non-current programming languages, such as COBOL or to programs for which source code is unavailable. Dynamic changes to such programs may be made by creating an interface for the program to make the program compatible with an object-oriented programming system, such as Java.

Communication services within and between distributed applications may be implemented equally well with other types of distributed protocols other than Java RMI, such as, for example, the Common Object Request Broker Architecture (CORBA) standard designed by the Object Management Group consortium. CORBA is the Object Management Group's answer to the need for interoperability among the rapidly proliferating number of hardware and software products available today. Simply stated, CORBA is an ORB that allows applications to communicate with one another no matter where they are located or who has designed them.

An ORB is the middleware that establishes the client-server relationships between objects. Using an ORB, client can transparently invoke a method on a server object, which can be on the same machine or across a network. The ORB intercepts the call and is responsible for finding an object that can implement the request, pass it the parameters, invoke its method, and return the results. The client does not have to be aware of where the object is located, its programming language, its operating system, or any other system aspects that are not part of an object's interface. In so doing, the ORB provides interoperability between applications on different machines in heterogeneous distributed environments and seamlessly interconnects multiple object systems.

In fielding typical client/server applications, developers use their own design or a recognized standard to define the protocol to be used between the devices. Protocol definition depends on the implementation language, network transport and a dozen other factors. ORBs simplify this process and provide flexibility. They let programmers choose the most appropriate operating system, execution environment and even programming language to use for each component of a system under construction. More importantly, ORBs allow the integration of existing components. In an ORB-based solution, developers simply model the legacy component using the same interface that they use for creating new objects, then write "wrapper" code that translates-between the standardized bus and the legacy interfaces.

CORBA is an ORB that represents an important advance towards object-oriented standardization and interoperability. With CORBA, users gain access to information transparently without having to know on which software or hardware platform the information resides or where it is located within a network. The goal in CORBA object development is the creation and registration of an object server, or simply server. A server is a program, which contains the implementation of one or more object types and which has been registered with the ORB.

CORBA details an object bus that lets objects communicate across enterprises and even continents. CORBA was designed to allow intelligent components to discover each other and inter-operate on an object bus. However, CORBA goes beyond just inter-operability. It also specifies an extensive set of bus-related services for creating and deleting objects, accessing them by name, storing them in persistent stores, externalizing their states, and defining ad-hoc relationships between them.

With the release of JDK version 1.1, Java has its own, built-in native ORB, called RMI. Though RMI is an ORB in the generic sense that it supports making method invocations on remote objects, it's not a CORBA-compliant ORB. RMI is native to Java. RMI is, in essence, an extension to the core Java language. RMI depends on many of the other features of Java-object serialization, portable, downloadable object implementations, and Java interface definitions, among others. On the other hand, RMI has some limitations—the principle limitation being a consequence of its greatest strength—its tight integration with Java makes it impractical for use with objects or applications written in any other language.

Java, with RMI by extension, is a concrete programming technology. It is primarily designed to solve the problems of writing and organizing executable code. As such, it constitutes a specific point in the space of programming technologies. The chasm that exists between Java and other programming languages is sometimes difficult to cross. The techniques used to make a call from Java code to Ada code are somewhat different from those used to make a call from Java code to C++ code, etc. This causes the complexity of building systems in a multilingual environment to increase significantly, sometimes non-linearly, with the number of languages being used.

Java supplies an API called JNI, or Java Native Interface, that allows Java code to call and be called by routines in other languages. It is primarily geared toward inter-operating with C and C++, and it is rather difficult interface to master. RMI is a Java-to-Java technology. If you want a Java client to use RMI to communicate with a remote object in another language, you must do it by way of a Java intermediary that is co-located with the "foreign" remote object. The underlying problem here is that Java is a programming technology that, by definition, works within the boundaries of the language itself.

By contrast, CORBA is an integration technology, not a programming technology. It is specifically designed to be the glue that binds disparate programming technologies together. CORBA does not exist as a point in the programming space by design, it occupies the spaces between the points representing individual languages. When a Java client uses CORBA technology to communicate with a C++ object, for example, both the C++ programmer and the Java programmer work completely within their respective language environments. The CORBA ORB presents the Java client with a Java stub interface and the C++ programmer with a C++ skeleton interface. CORBA resolves the cross-language issues automatically.

CORBA offers an integration-oriented point of view, where design efforts focus on the boundaries between elements of the system. The underlying interface technologies (e.g., IIOP) are designed to make those boundaries as flexible, adaptive, and programming technology-independent as possible. Interface technologies, such as CORBA, not only have longer half-lives than programming technologies, they are the best defense against the adding and death of applications due to dependence on obsolete programming technology.

Figure 5:
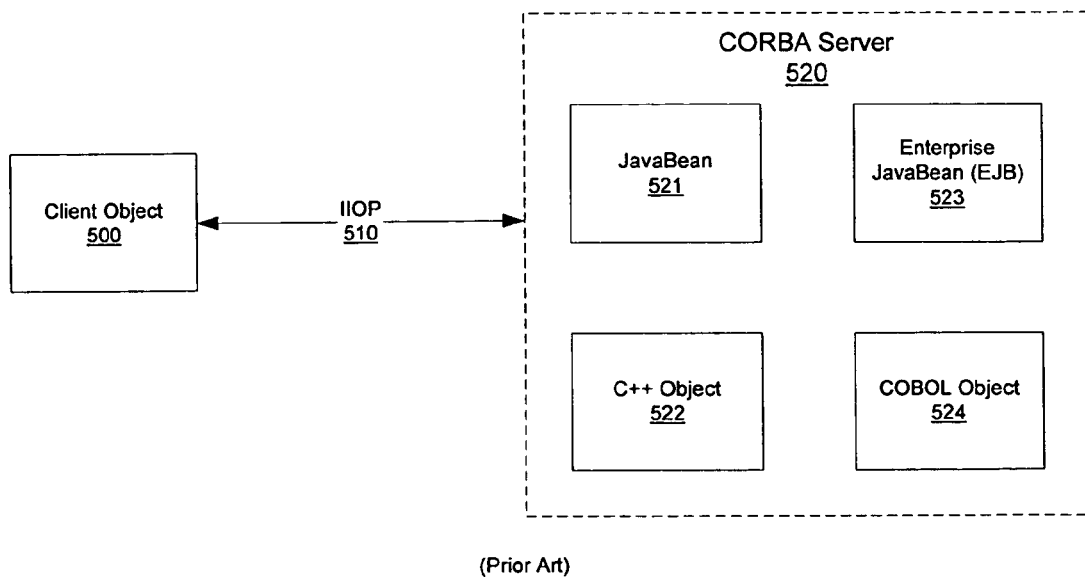
FIG. 5 is a diagram illustrating a prior art distributed application using the CORBA standard.

With reference now to FIG. 5, a diagram illustrates a prior art distributed application using the CORBA standard. Client object 500 communicates with CORBA server 520 using the IIOP standard illustrated as communication link 510. CORBA server 520 provides integration and interoperability for disparate types of software objects. JavaBean 521, C++ object 522, Enterprise JavaBean (EJB) 523, and COBOL object 524 communicate and register with service functions using the CORBA services provided by server 520. Client object 500 may invoke functions and methods provided by objects 521–524 through the CORBA services.

Figure 6:
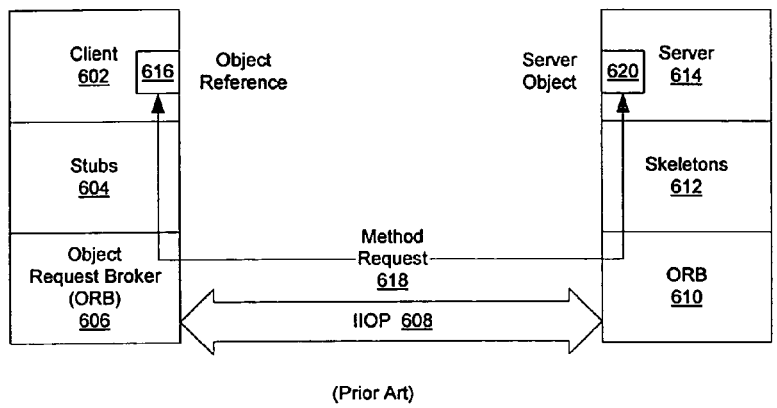
FIG. 6 is a diagram depicting the components within a prior art distributed application that uses CORBA to provide interoperability functions.

With reference now to FIG. 6, a diagram depicts the components within a prior art distributed application that uses CORBA to provide interoperability functions. FIG. 6 shows method request 618 sent from client 602 to a CORBA object implementation in a server. A client is any code, perhaps itself a CORBA object, that invokes a method on a CORBA object. Servant 620 is an instance of the object implementation the actual code and data that implements the CORBA object.

Client 602 of a CORBA server object has object reference 616 for the server object and the client uses this object reference to issue method request 618.

An object reference is the information needed to specify an object within an ORB. Clients typically obtain object references in a few different ways. First, a client can invoke a "create" method on an object in order to create the object. The create method would return an object reference for the new object to the client. Second, a client could obtain an object reference by issuing a request to a naming service. A naming service stores object references by name in a data structure, and a client may lookup or resolve object references by the object's associated name rather than some type of hardcoded network address, i.e., locate an object within the same physical machine or elsewhere on the network. Finally, a client may obtain an object reference from a string that was specifically created by stringifying an object reference.

Once an object reference is obtained, the client narrows the CORBA object to its proper type so that the client can invoke on it.

If the server object is remote, the object reference points to stub function 604, which uses the ORB machinery to forward invocations to the server object. A CORBA client needs a local ORB object to perform all of its data marshalling and IIOP work. The stub code uses ORB 606 to identify the machine that runs the server object and asks that machine's ORB 610 for a connection to the object's server 614. When the stub code has the connection, it sends the object reference and parameters to skeleton code 612 linked to the destination object's implementation. The skeleton code transforms the call and parameters into the required implementation-specific format and calls the object. Any results or exception are returned along the same path.

The client has no knowledge of the CORBA object's location, implementation details, nor which ORB is used to access the object. Different ORBs may communicate via Internet InterORB Protocol (IIOP) 608.

A client may only invoke methods that are specified in the CORBA object's interface. An interface defines an object type and specifies a set of named methods and parameters as well as the exception types that these methods may return. A client of a server object has access to an object reference for the server object and invokes operations on the object. A client object knows only the logical structure of the server object according to its interface and experiences the behavior of the server object through method invocations. It is important to realize that the client-server relationship is relative to two particular objects the implementation of one server object may be a client of other server objects.

The stub and skeleton files are generated in a variety of ways. Stub files present the client with access to server methods in the client programming language. The server skeleton files glue the object implementation to the ORB runtime. The ORB uses the skeletons to dispatch methods to the object implementation instances (servants).

Turning now from the discussion of the prior art to a discussion of the present invention, the descriptions of FIGS. 7A–14 provide details of the present invention for combining the advantages of Java and CORBA. As noted previously, RMI is a Java-to-Java technology that mandates that a Java client must use RMI to communicate with a remote object. Java is a programming technology that, by definition, works within the boundaries of the language itself. By contrast, CORBA is an integration technology, not a programming technology. The present invention allows a Java client to invoke the business methods of an EJB residing on a CORBA client.

Figure 7A:
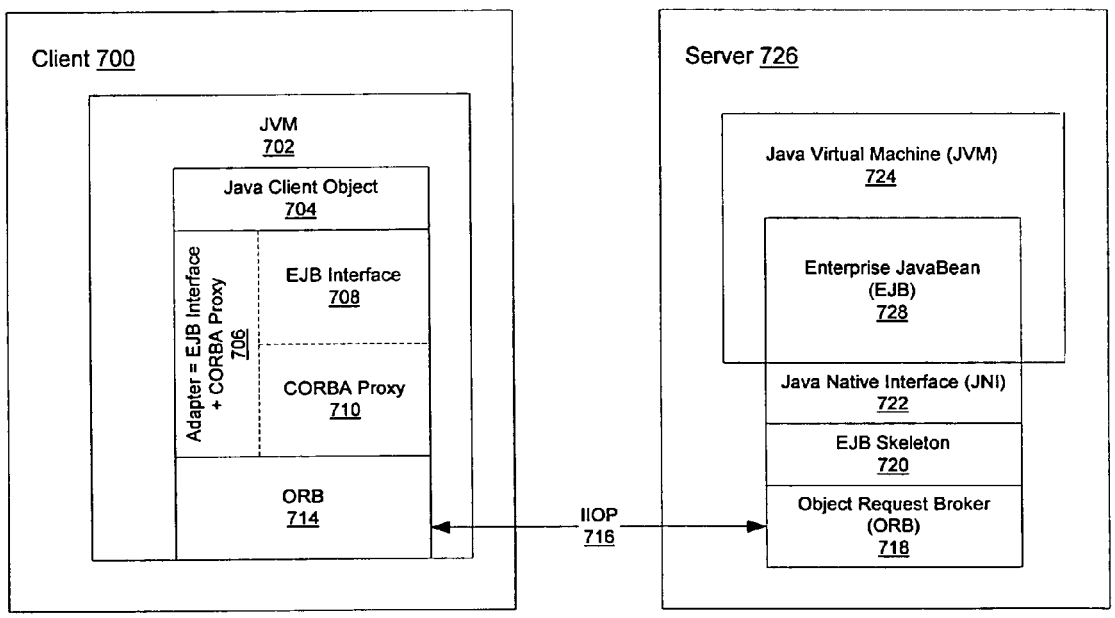
FIG. 7A is a block diagram depicting the components that may be used to implement a method for invoking remote business methods of an Enterprise JavaBean running in a CORBA server.

With reference now to FIG. 7A, a block diagram depicts the components that may be used to implement a method for invoking remote business methods of an Enterprise JavaBean running in a CORBA server. The system in FIG. 7A is similar to the systems shown in FIGS. 4 and 6. FIG. 7A is similar to the distributed application shown in FIG. 4 except that client 700 and server 726 are specifically enabled with a Java runtime environment that contains JVM 702 and JVM 724. FIG. 7A is similar to FIG. 6 because Java client object 704 is attempting to invoke a method within remote EJB 728 similar to client 602 and server 614.

In addition, the distributed application in FIG. 7A comprises ORB 714 and ORB 718 for communicating object requests and responses across IIOP 716. The generic architecture of FIG. 6 comprising a client, a server, stubs, and skeletons, and object request broker is reflected in the software architecture of FIG. 7A that allows Java objects to communicate using CORBA according to the method of the present invention.

JVM 702 comprises Java client object 704 that is attempting to invoke a business method residing in EJB 728. The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a module in the JVM that alternately decodes and executes a bytecode or bytecodes. These bytecode instructions are designed to be easy to interpret on any computer and easily translated on the fly into native machine code.

JVM 702 also comprises adapter 706 that provides EJB interface 708 to client object 704 so that client object 704 may call a method in EJB interface 708 using the known method of remote method invocation. EJB interface 708 calls CORBA proxy 710 to initiate CORBA communication with server 726. CORBA proxy 710 passes an object request to ORB 714. In this example, ORB 714 is implemented in Java. If the ORB was implemented in C++, then the object request would pass through a Java Native Interface (JNI). ORB 714 and ORB 718 communicate across IIOP 716 to ensure that object requests are transparently supported by the client and server objects using the object request broker. Once ORB 718 receives an object request, code within EJB skeleton 720 is called to begin the invocation of the requested business method from EJB 728. EJB skeleton 720 uses JNI 722 to invoke EJB 728 and pass the appropriate arguments to EJB 728 contained within JVM 724. In this particular example, EJB skeleton 720 may be implemented in C++ but could be implemented in another language other than Java that would require the use of JNI 722.

Figure 7B:
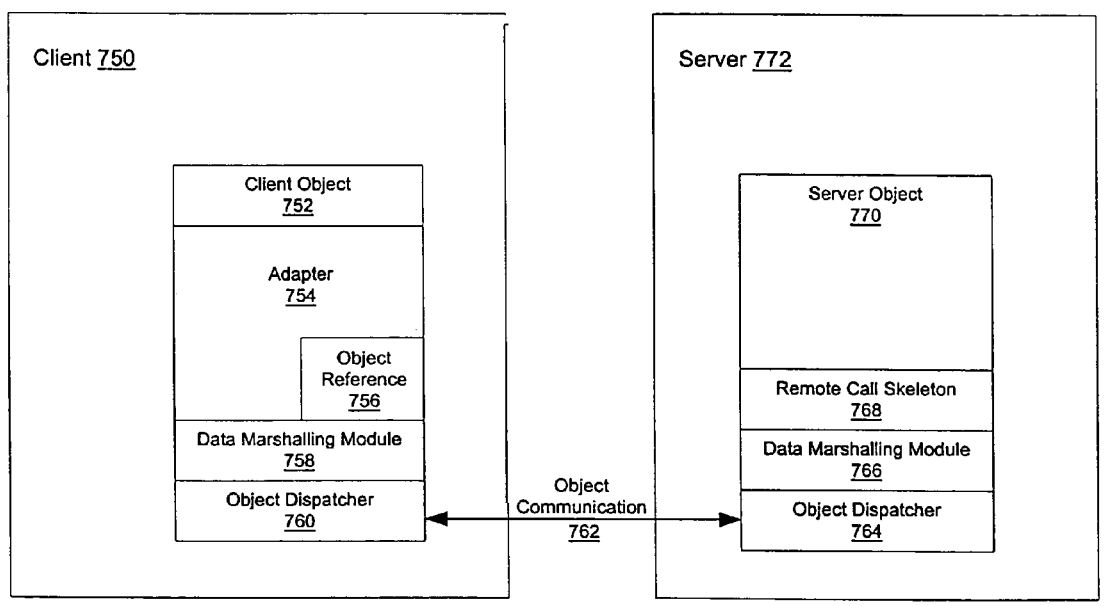
FIG. 7B is a block diagram depicting the components that may be used to implement a method for invoking remote methods of a server object.

With reference now to FIG. 7B, a block diagram depicts the components that may be used to implement a method for invoking remote methods of a server object. The system in FIG. 7B is similar to the system shown in FIG. 7A except that it has been generalized for an environment in which client 750 has client object 752 implemented in one language and server 772 has server object 770 implemented in a different language.

Client 750 comprises adapter 754. An adapter uses object reference 756 to simulate a remote method invocation on server object 770 on behalf of client object 752. Client object 752 invokes a method within adapter 754, which calls object reference 756 to initiate object communication with server 772. Object reference 756 passes an object request through data marshalling module 758 to object dispatcher 760. Object dispatcher 760 and object dispatcher 764 communicate across object communication link 762 to ensure that object requests are transparently supported by the client and server objects using an appropriate object request protocol. Object dispatcher 764 passes an object request through data marshalling module 766 to remote call skeleton 768. Data marshalling module 758 and data marshalling module 766 provide appropriate data conversion and call translation facilities for the interoperable environment consisting of objects implemented in different languages. Remote call skeleton 768 invokes the method in server object 770 and passes the appropriate arguments to server object 770.

Figure 8:
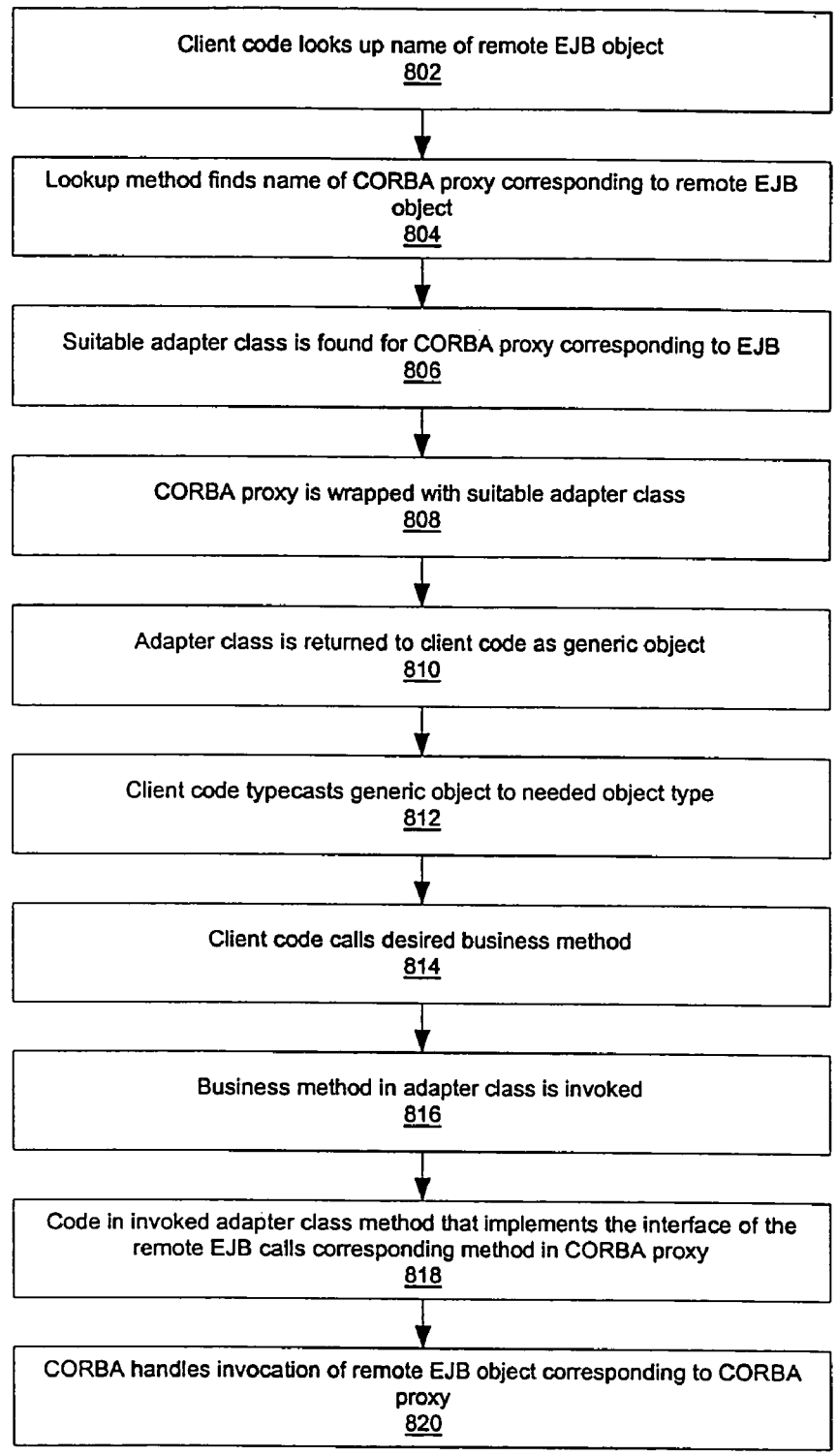
FIG. 8 is a flowchart depicting the steps of a method for invoking a remote business method on an Enterprise JavaBean running in a CORBA server.

With respect to FIG. 8, a flowchart depicts the steps of a method for invoking a remote business method on an Enterprise JavaBean running in a CORBA server. The process flow from the Java client object through the Java adapter, ORB, and EJB skeleton to the desired EJB, as described with respect to FIG. 7A, is similar to the process flow further described in FIG. 8, which describes actual calls and class manipulations within the Java and CORBA environment of the present invention.

The process begins when code within the client looks up the name of a remote object (step 802). The client may require the execution of a method of an object in a remote server, such as a business method within an EJB. The code within the lookup method finds the name of a CORBA proxy that corresponds to the remote object containing the desired method (step 804). After an appropriate CORBA proxy is found, a suitable adapter class is located for its corresponding CORBA proxy (step 806). The CORBA proxy is wrapped with the suitable adapter class (step 808), and the adapter class is returned to the calling client code as a generic object (step 810). The client code typecasts the returned generic object to the necessary class type (step 812). The client code then calls the desired method from the newly obtained object (step 814), and the desired method in the newly obtained adapter class is invoked (step 816). The code within the invoked adapter class method calls its corresponding method in the CORBA proxy (step 818). Once the method begins executing within the CORBA proxy, the CORBA infrastructure handles the invocation of the remote object corresponding to the CORBA proxy on the CORBA server (step 820).

The method steps of FIG. 8 may be generalized for the object-oriented environment shown in FIG. 7B. Rather than invoking a method of an EJB through a CORBA proxy, the source object and target objects have been generalized to a method of a server object being invoked through its object reference. According to the generalized method of the present invention, the object reference for the server object is wrapped with an adapter so that the client object's invocation of a method in the server object is transparently handled by an adapter. When the client object attempts to invoke a method of the server object, the method is actually invoked within an adapter object. The adapter class essentially wraps the object reference in a manner such that the object reference is isolated from the client code. The client does not know anything about the object reference. The client only "talks" to the adapter code whereas the object reference that "talks" to the skeleton code on the server does not know anything about the client-based adapter.

With reference now to FIGS. 9A–9D, examples of Java programming language statements are shown that describe a distributed application in which a Java client invokes a remote business method from an Enterprise JavaBean running in a CORBA server. In FIG. 9A, an example shows the standard RMI technique in a Java program. A remote object of the CustomerImpl class may have a set of business methods represented by an interface CustomerInterface. Methods included within CustomerInterface can be invoked remotely from a Java client. In this case, the client code would appear similar to statements 902–906. Statement 902 shows the use of a naming service to obtain an object reference for a remote object. Object "obj" is an RMI proxy of the remote Java object that implements CustomerInterface. After obtaining an object reference in statement 902, the object is narrowed by typecasting it to the appropriate object type in statement 904. In statement 906, the Java client code calls a business method on the proxy object as if it were a local object. The client is unaware that the call is implemented using an ORB. The proxy object transfers the method call to the remote object in a manner defined by the CORBA standard.

According to a method of the present invention, the RMI behavior within Java is simulated using the CORBA mechanism for executing remote objects. A special NamingContext and a set of adapter classes are implemented as shown in FIGS. 9B–9D. The lookup method in the special NamingContext class is implemented as shown in FIG. 9B. Statement 912 shows the definition of the special lookup method. Statement 914 shows that a lookup method within the CORBA naming services is used to find a CORBA proxy corresponding to the desired remote object in statement 914. Once the CORBA proxy is found, statement 916 creates a new adapter class. Statement 918 shows that a CORBA proxy is wrapped by the suitable adapter class. Statement 920 shows the return of an object reference as a return value from the lookup method.

FIG. 9C shows an example of the client code for a simulated RMI similar to the RMI shown in FIG. 9A. Statement 922 shows the lookup of the remote object by the name of the remote object using a new NamingContext class as implemented by the code shown in FIG. 9B. Once an object reference is returned, statement 924 shows that the object reference must be narrowed or typecast using the CustomerInterface class. Statement 926 shows the desired business method being called within the client code. However, the business method invoked on the "cust" instance of the CustomerInterface class is actually invoked on the adapter object that was returned by the newly defined NamingContext class.

FIG. 9D shows the code within the adapter class for the business method. Statement 930 shows the beginning of the definition of the businessMethod method. Statement 932 shows that the adapter code delegates the desired method call to the CORBA proxy. In this case, the proxy is a Java class implementation of the CORBA proxy for a skeleton of the EJB on the CORBA server.

The adapter class must implement the business interface supported by the EJB on the CORBA server. The adapter class essentially wraps the CORBA proxy in a manner such that the CORBA proxy is isolated from the Java client code. It is important to note that the Java client does not know anything about the CORBA proxy. The Java client only talks to the Java-based adapter code whereas the CORBA proxy that talks to the skeleton code on the CORBA server does not know anything about the Java-based adapter.

In the examples shown in FIGS. 9B–9D, the arguments for the business method of the remote object are simply passed from the adapter to the proxy object. No data conversion for the arguments are shown. If a business method takes or returns an EJB as an argument, it is the duty of the adapter code of that business method to perform appropriate wrapping or unwrapping of the proxy object by a suitable adapter as necessary. In the example, a business method is invoked for a CustomerInterface class without expecting a return value.

In an example in which a business method takes an integer and an EJB as arguments and returns an EJB as a return value, the EJBs must be wrapped and unwrapped.

With respect to FIGS. 10A–10C, examples of Java programming language statements describe a process of wrapping and unwrapping EJBs used as arguments to Java methods. FIG. 10A is an example of a declaration of a Java business method that takes an integer and an EJB of type-"Employee" as arguments and returns an EJB of type "Customer" as a return value.

FIG. 10B shows an example of a simulated RMI for a business method in a remote EJB. In manner similar to the remote EJB shown in FIGS. 9B–9D, FIG. 10B uses the method of the present invention for wrapping and unwrapping a proxy with an adapter except that the example depicts additional steps for wrapping and unwrapping arguments of a business method as discussed above. Statement 1010 shows the lookup of "EmployeeName" and its assignment to object "obj1", and statement 1012 shows the narrowing of "obj1" to object "ee" of type "Employee". Statement 1014 shows the lookup of "CustomerName", and statement 1016 shows the invocation of a business method in the Customer class with an EJB argument "ee" and the return value of a new customer "newCust".

When a business method is invoked on the adapter by a Java client by passing in the employee EJB as an argument, which in this case is an adapter object that implements an "Employee" interface, the adapter code unwraps the adapter from "Employee ee" and passes the CORBA proxy inside it over the ORB. Similarly, the resulting return value returned across the ORB actually contains a CORBA proxy of the customer EJB. In this case, the adapter code wraps the return proxy with a suitable adapter before sending it back to the client.

FIG. 10C shows an example of the adapter code in the CustomerAdapter class in a manner similar to that shown in FIG. 9D except that FIG. 10C shows the necessary steps for wrapping and unwrapping EJB arguments as necessary. Statement 1020 shows a declaration of a business method in the adapter class that excepts an integer "I" and "Employee ee" as arguments and returns a customer as a return value. Statement 1022 shows argument "ee" being recast as type "eeAdapter". Statement 1024 shows "eeAdapter" being unwrapped to obtain a CORBA proxy from the EmployeeAdapter. Statement 1026 shows the business method being invoked on the proxy object with the "eeProxy" as an argument since only CORBA proxy objects should be passed over the ORB. Statement 1028 shows the wrapping of the returned proxy "custProxy" with a suitable adapter to obtain "custAdapter". Statement 1030 then shows "custAdapter" being returned as a return value from the invocation of the business method to the calling client object. In this manner, the adapter code, in addition to delegating method calls to the CORBA proxy, also performs data conversion as necessary. In this case, the adapter code wraps and unwraps EJBs passed as arguments in business method. In addition, the adapter also performs any data types that are not supported by the ORB implementation.

Figure 11:
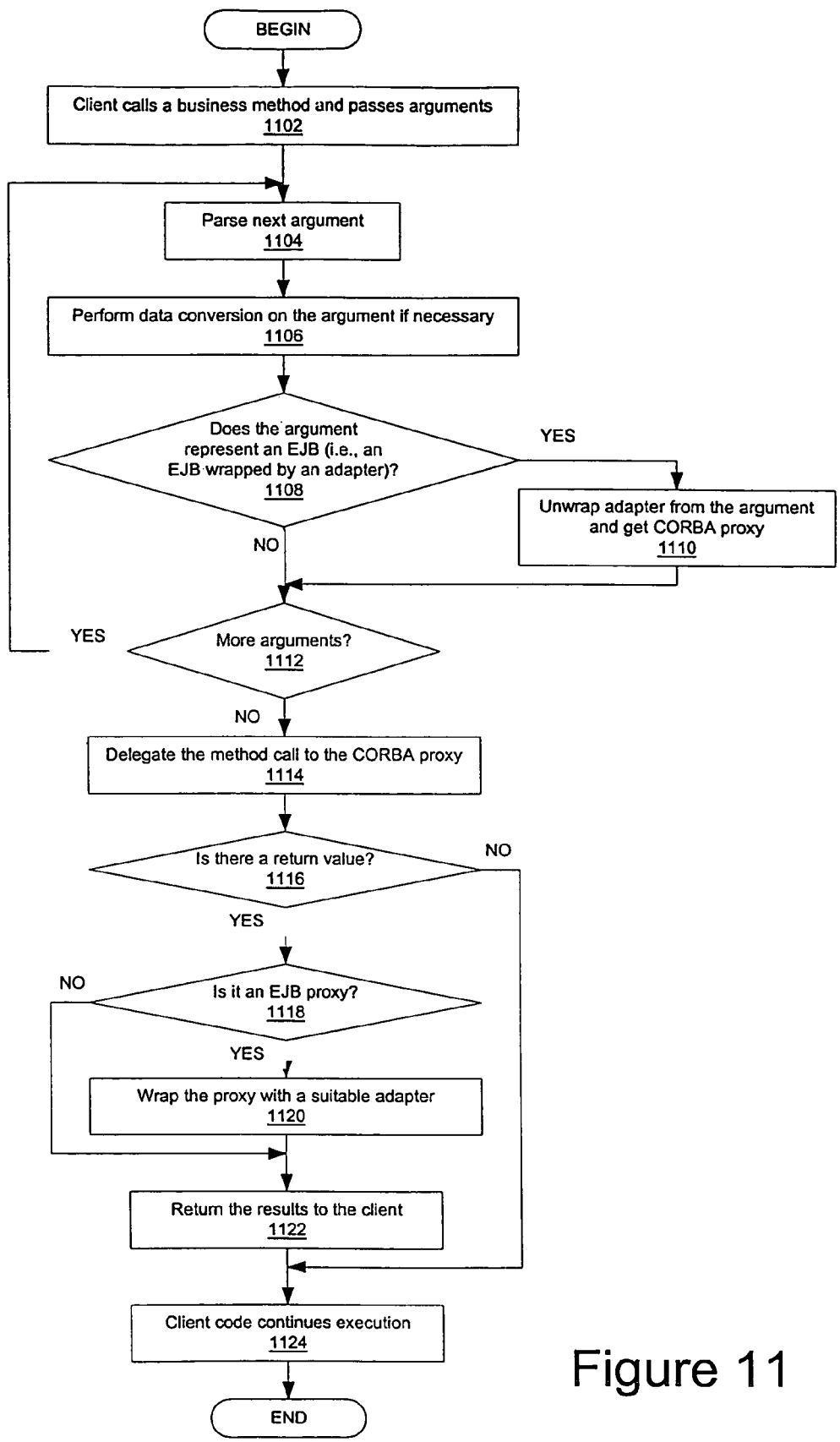
FIG. 11 is a flowchart depicting the wrapping and unwrapping of EJB arguments with suitable adapters according to the method of the present invention.

With reference now to FIG. 11, a flowchart depicts the wrapping and unwrapping of EJB arguments with suitable adapters according to the method of the present invention. The process begins when a client object calls a business method and passes various arguments into the business method (step 1102). In this case, the client invokes a method within the adapter class that is implementing the interface for the business method of the remote EJB on a CORBA server. The adapter parses the list of arguments for the business method (step 1104) and performs data conversion on the argument if necessary (step 1106). A determination is then made as to whether the argument represents an EJB, which in this case would be the CORBA proxy for the EJB wrapped by an adapter (step 1108). If so, then the adapter code unwraps the adapter from the EJB argument and obtains the CORBA proxy (step 1110).

If the argument is not an EJB, the process continues to the determination of whether there are more arguments to be processed for this method call (step 1112). If so, the process returns to step 1104 to obtain the next argument. If there are no more arguments, then the adapter delegates the method call to the CORBA proxy representing the EJB across the ORB (step 1114).

A determination is then made as to whether there is a return value for the called CORBA proxy (step 1116). If not, then the adapter completes execution and returns control flow to the client code (step 1124). If there is a return value, a determination is then made as to whether the return value is an EJB proxy (step 1118). If not, then the return value is returned as a result value to the client (step 1122). If the return value is an EJB proxy, then the adapter wraps the returned proxy with a suitable adapter (step 1120) before returning the results to the client (step 1122). The process then completes with the client code continuing its execution (step 1124).

The advantage of the present invention should be apparent with reference to the detailed description of the figures given above. Java provides a mechanism by which a Java client can invoke methods on Java server that is running in a separate process using a methodology called Remote Method Invocation (RMI). However, if the server is not running in a Java environment, such as a CORBA compliant server, then the Java client cannot make any method calls to the method on the server since Java does not provide an inherent mechanism for communicating with CORBA objects. There is also no standard mechanism for performing data marshalling, i.e., data conversion for different types of data, between a Java client and a CORBA server. These methods may involve passing references to other EJBs running on other servers. There is no standard mechanism that allows a Java client to communicate with another Java application, such as an EJB, running in a non-Java environment, such as a CORBA server.

The present invention uses adapters that are generated by introspecting on the interfaces of the Enterprise JavaBean running in the CORBA server. These adapters reside on the Java client-side and carry within them a remote proxy of the CORBA server that runs the EJB. An adapter is a Java class that implements the interfaces specified by the EJB for invoking its business methods. Adapters delegate all of the business method calls from the client to the CORBA proxy on the server and perform data marshaling from the Java client to the CORBA proxy and vice versa.

From the perspective of the client object, an adapter is a replica of an EJB that actually resides on the CORBA server. The client object is not even aware that it communicates with the EJB across an object request broker to the CORBA server. An adapter stores in itself a CORBA proxy of the server that runs the EJBs. Any business method call made by the client to the adapter is delegated by the adapter to the CORBA proxy after appropriate data conversion. Thus, the adapter acts as transparent glue between the Java client and the EJB on the CORBA server.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A process for invoking a method of a server object in a distributed application in a distributed data processing system, the process comprising the computer-implemented steps of:

executing a client object in a client that implements a first programming environment, said client object being written for said first programming environment;

executing a server object in a server that implements a second programming environment that is different from said first programming environment, said server object being written for said first programming environment;

executing said client object which begins an attempt to invoke a method in the server object;

in response to the client object beginning the attempt to invoke the method in the server object;

obtaining an object reference on the client for said second programming environment;

wrapping the object reference in an adapter which isolates the object reference from said client object, and the adapter performing data conversion between the object reference and the client object for different types of data, wherein the step of performing data conversion between the object reference and the client object for different types of data comprises:

responsive to receiving a method called by the client object, parsing the method for an argument;

performing data conversion on the argument if necessary;

determining if the argument is wrapped by an adapter;

if the argument is wrapped by an adapter, unwrapping the adapter from the argument to retrieve an object reference of the argument, wherein to object reference of the argument provides a reference to a server object in the second programming environment representing the argument;

delegating the method called by the client object to the object reference of the argument;

responsive to detecting a return value, determining if the return value is an object reference for the second programming environment;

if the return value is an object reference for the second programming environment, wrapping the object reference with a suitable adapter based on a type of the object reference; and returning the wrapped object reference to the client object.

2. The process of claim 1 wherein the adapter uses the object reference to invoke a method of a skeleton on the server.

3. The process of claim 1 wherein the skeleton invokes a method of a server object.

4. A method for implementing a distributed application in a distributed data processing system, the method comprising the computer-implemented steps of:

executing a client object in a client that implements a first programming environment, said client object being written for said first programming environment;

executing a server object in a server that implements a second programming environment that is different from said first programming environment, said server object being written for said first programming environment;

in response to the client object beginning an attempt to invoke a method in the server object;

obtaining a proxy for the second programming environment; and wrapping the proxy in an adapter which isolates the proxy from the client object, and the adapter performing data conversion between the proxy and the client object for different types of data, wherein the step of performing data conversation between the proxy and the client object for different types of data comprises:

responsive to receiving a method called by the client object, parsing the method for an argument;

performing data conversion on the argument if necessary;

determining if the argument is wrapped by an adapter;

if the argument is wrapped by an adapter, unwrapping the adapter from the argument to retrieve a proxy of the argument, wherein the proxy of the argument provides a reference to a server object in the second programming environment representing the argument;

delegating the method called by the client object to the proxy of the argument;

responsive to detecting a return value, determining if the return value is a proxy for the second programming environment;

if the return value is proxy for the second programming environment, wrapping the proxy with a suitable adapter based on a type of the object reference; and returning the wrapped proxy to the client object.

5. The method of claim 4 wherein the adapter is a Java class that implements an interface supported by the server object.

6. The method of claim 4 wherein the server object is an Enterprise JavaBean.

7. The method of claim 4 wherein the object reference is obtained from a naming service.

8. The method of claim 4 wherein the proxy is a Common Object Request Broker Architecture (CORBA) proxy.

9. The method of claim 8 wherein the adapter calls a method of the CORBA proxy.

10. The method of claim 8 wherein the CORBA proxy is a Java class residing on a client computer.

11. The method of claim 8 wherein the CORBA proxy passes the method request to an object request broker.

12. A data processing system for invoking a method of a server object in a distributed application in a distributed data processing system, the data processing system comprising:

execution means for executing a client object in a client that implements a first programming environment, said client object being written for said first programming environment;

execution means for executing a server object in a server that implements a second programming environment that is different from said first programming environment, said server object being written for said first programming environment;

execution means for executing said client object which begins an attempt to invoke a method in the server object;

in response to the client object beginning the attempt to invoke the method in the server object;

obtaining means for obtaining an object reference on the client for said second programming environment;

wrapping means for wrapping the object reference in an adapter which isolates the object reference from the client object, and the adapter performing data conversion between the object reference and the client object for different types of data, wherein the means for performing data conversion between the object reference and the client object for different types of data comprises:

responsive to receiving a method called by the client object, parsing means for parsing the method for an argument;

performing means for performing data conversion on the argument if necessary;

determining means for determining if the argument is wrapped by an adapter;

if the argument is wrapped by an adapter, unwrapping means for unwrapping the adapter from the argument to retrieve an object reference of the argument, wherein the object reference of the argument provides a reference to a server object in the second programming environment representing the argument;

delegating means for delegating the method called by the client object to the object reference of the argument;

responsive to detecting a return value, determining means for determining the return value is an object reference for the second programming environment;

if the return value is an object reference for the second programming environment, wrapping means for wrapping the object reference with a suitable adapter based on a type of the object reference; and returning means for returning the wrapped object reference to the client object.

13. The data processing system of claim 12 wherein the adapter uses the object reference to invoke a method of a skeleton on the server.

14. The data processing system of claim 12 wherein the skeleton invokes a method of a server object.

15. A data processing system for implementing a distributed application in a distributed data processing system, the data processing system comprising:

execution means for executing a client object in a client that implements a first programming environment, said client object being written for said first programming environment;

execution means for executing a server object in a server that implements a second programming environment that is different from said first programming environment, said server object being written for said first programming environment;

in response to the client object beginning an attempt to invoke a method in the server object;

obtaining means for obtaining an object reference for the second programming environment;

wrapping means for wrapping the proxy in an adapter which isolates the proxy from the client object, and the adapter performing data conversion between the proxy and the client object for different types of data, wherein the means for performing data conversion between the proxy and the client object for different types of data comprises:

responsive to receiving a method called by the client object, parsing means for parsing the method for an argument;

performing means for performing data conversion on the argument if necessary;

determining means for determining if the argument is wrapped by an adapter;

if the argument is wrapped by an adapter, unwrapping means for unwrapping the adapter from the argument to retrieve a proxy of the argument, wherein the proxy of the argument provides a reference to a server object in the second programming environment representing the argument;

delegating means for delegating the method called by the client object to the proxy of the argument;

responsive to detecting a return value, determining means for determining if the return value is a proxy for the second programming environment;

if the return value is proxy for the second programming environment, wrapping means for wrapping the proxy with a suitable adapter based on a type of the object reference; and returning means for returning the wrapped proxy to the client object.

16. The data processing system of claim 15 wherein the adapter is a Java class that implements an interface supported by the sewer object.

17. The data processing system of claim 15 wherein the sewer object is an Enterprise JavaBean.

18. The data processing system of claim 15 wherein the object reference is obtained from a naming service.

19. The data processing system of claim 15 wherein the proxy is a Common Object Request Broker Architecture (CORBA) proxy.

20. The data processing system of claim 19 wherein the adapter calls a method of the CORBA proxy.

21. The data processing system of claim 19 wherein the CORBA proxy is a Java class residing on a client computer.

22. The data processing system of claim 19 wherein the CORBA proxy passes the method request to an object request broker.

23. A computer program product in a computer readable medium for use in a data processing system for invoking a method of a server object in a distributed application in the distributed data processing system, the computer program product comprising:

instructions for executing a client object in a client that implements a first programming environment said client object being written for said first programming environment;

instructions for executing a server object in a server that implements a second programming environment that is different from said first programming environment, said server object being written for said first programming environment;

instructions for executing said client object which begins an attempt to invoke a method in the server object;

in response to the client object beginning the attempt to invoke the method in the server object;

instructions for obtaining an object reference on the client for said second programming environment;

instructions for wrapping the object reference in an adapter which isolates the object reference from the client object, and the adapter performing data conversion between the object reference and the client object for different types of data, wherein the instructions for performing data conversion between the object reference and the client object for different types of data comprises:

responsive to receiving a method called by the client object, instructions for parsing the method for an argument;

instructions for performing data conversion on the argument if necessary;

instructions for determining if the argument is wrapped by an adapter;

if the argument is wrapped by an adapter, instructions for unwrapping the adapter from the argument to retrieve an object reference of the argument, wherein the object reference of the argument provides a reference to a server object in the second programming environment representing the argument;

instructions for delegating the method called by the client object to the object reference of the argument;

responsive to detecting a return value, instructions for determining if the return value is an object reference for the second programming environment;

if the return value is an object reference for the second programming environment, instructions for wrapping the object reference with a suitable adapter based on a type of the object reference; and instructions for returning the wrapped object reference to the client object.

24. A computer program product in a computer readable medium for use in a data processing system for implementing a distributed application in a distributed data processing system, the computer program product comprising:

instructions for executing a client object in a client that implements a first programming environment, said client object being written for said first programming environment;

instructions for executing a server object in a server that implements a second programming environment that is different from said first programming environment, said server object being written for said first programming environment;

in response to the client object beginning an attempt to invoke a method in the server object;

instructions for obtaining an object reference for the second programming environment;

instructions for wrapping the proxy in an adapter which isolates the proxy from the client object, and the adapter performing data conversion between the proxy and the client object for different types of data, wherein the instructions for performing data conversion between the proxy and the client object for different types of data comprises:

responsive to receiving a method called by the client object, instructions for parsing the method for an argument;

instructions for performing data conversion on the argument if necessary;

instructions for determining if the argument is wrapped by an adapter;

if the argument is wrapped by an adapter, instructions for unwrapping the adapter from the argument to retrieve a proxy of the argument, wherein the proxy of the argument provides a reference to a server object in the second programming environment representing the argument;

instructions for delegating the method called by the client object to the proxy of the argument;
responsive to detecting a return value, instructions for determining if the return value is a proxy for the second programming environment;
if the return value is proxy for the second programming environment, instructions for wrapping the proxy with a suitable adapter based on a type of the object reference; and
instructions for returning the wrapped proxy to the client object.

* * * * *

UNITED STATES PATENT AND TRADEMARK OFFICE
CERTIFICATE OF CORRECTION

PATENT NO. : 6,959,307 B2 Page 1 of 1
APPLICATION NO. : 10/700181
DATED : October 25, 2005
INVENTOR(S) : Apte It is certified that error appears in the above-identified patent and that said Letters Patent is hereby corrected as shown below:

Col. 16, line 46: after "where" delete "to" and insert --the--.

Col. 18, line 32: after "determining" insert --if--.

Col. 19, line 29: after "the" delete "sewer" and insert --server--.

Col. 19, line 31: before "object" delete "sewer" and insert --server--.

Signed and Sealed this

Fifth Day of December, 2006

JON W. DUDAS
*Director of the United States Patent and Trademark Office*